United States Patent
Pan et al.

(10) Patent No.: US 8,239,601 B2
(45) Date of Patent: Aug. 7, 2012

(54) INTEGRATED DATA ACCESSING SYSTEM HAVING CONTROL APPARATUS FOR MULTI-DIRECTIONAL DATA TRANSMISSION

(75) Inventors: Chih-kang Pan, Taipei (TW); Hsiang-chi Hsieh, Sindian (TW)

(73) Assignee: Genesys Logic, Inc., Shindian (TW)

( * ) Notice: Subject to any disclaimer, the term of this patent is extended or adjusted under 35 U.S.C. 154(b) by 767 days.

(21) Appl. No.: 12/406,612

(22) Filed: Mar. 18, 2009

(65) Prior Publication Data

US 2009/0198860 A1 Aug. 6, 2009

Related U.S. Application Data

(63) Continuation-in-part of application No. 11/798,191, filed on May 11, 2007, now abandoned.

(51) Int. Cl.
*G06F 13/00* (2006.01)
(52) U.S. Cl. ........................................ 710/300
(58) Field of Classification Search .................. 710/300
See application file for complete search history.

(56) References Cited

U.S. PATENT DOCUMENTS

| | | | |
|---|---|---|---|
| 6,266,784 B1 * | 7/2001 | Hsiao et al. ................. 714/6.3 |
| 7,328,325 B1 * | 2/2008 | Solis et al. .................... 711/202 |
| 7,340,616 B2 * | 3/2008 | Rothman et al. .............. 713/300 |
| 7,376,764 B1 * | 5/2008 | Todd ............................... 710/38 |
| 7,844,756 B2 * | 11/2010 | Cannon et al. .................. 710/38 |

* cited by examiner

*Primary Examiner* — Paul R Myers
*Assistant Examiner* — Jeremy S Cerullo
(74) *Attorney, Agent, or Firm* — Kirton McConkie; Evan R. Witt

(57) ABSTRACT

An integrated data accessing system having control apparatus for multi-directional data transmission is described. The integrated data accessing system includes a control apparatus, a plurality of communication interface engines. The control apparatus includes a plurality of bi-directional transmission modules, a control unit, a multi-directional transferring engine, and a memory unit. The control unit detects a source storage and a target storage. The multi-directional transferring engine selectively transfers the data content among storage units. The multi-directional transferring engine includes a first switch module, a second switch module, and a data buffer. The first switch module switches to the first bi-directional transmission module to select the source storage. The second switch module switches to the second bi-directional transmission module to select the target storage. The data buffer stores the data content transmitted from the source storage and the target storage. The multi-directional transferring engine transfers the data content in the source storage via the first bi-directional transmission module to the target storage via the second bi-directional transmission module when the control unit triggers the first switch module and the switch second module.

25 Claims, 3 Drawing Sheets

INTEGRATED DATA ACCESSING SYSTEM HAVING CONTROL APPARATUS FOR MULTI-DIRECTIONAL DATA TRANSMISSION

CROSS REFERENCE TO RELATED APPLICATION

This patent application is a Continuation-in-Part and claims priority of U.S. application Ser. No. 11/798,191, entitled "CARD READING APPARATUS FOR MULTI-DIRECTIONAL DATA TRANSMISSION", which is filed on May 11, 2007, incorporated herein by reference.

FIELD OF THE INVENTION

The present invention relates to a data accessing system, and more particularly relates to an integrated data accessing system having control apparatus for multi-directional data transmission.

BACKGROUND OF THE INVENTION

The conventional Universal Serial Bus (USB) on-the-go (OTG) host device, such as data bank, usually has one or two USB ports for connecting to peripheral device which is compatible to USB protocol. The USB OTG host device further includes Integrated Drive Electronics (IDE) port for connecting a hard disk drive so that the data content in the USB peripheral device, e.g. portable disk, connected to the USB port may be copied to the hard disk drive in the IDE port. In addition, memory card reader for reading and writing a variety of memory cards, such as secure digital (SD) memory card, multi-media card (MMC), and memory stick card, only supports the data copy from the card reader to the IDE port in one-way mode. That is, the data content in the flash memory card is reproduced to the hard disk drive in single-directional mode.

Specifically, the USB OTG host devices do not support the reverse data transmission. In other words, the data content in the hard disk drive and the flash memory card connected to the card reader cannot be copied to the USB peripheral device. Conventionally, to accomplish this application, a desktop personal computer (PC) or a notebook computer is utilized to perform the reverse data transmission from the hard disk drive and the flash memory card, respectively, to the USB peripheral device. It is quite inconvenient and time-consuming for the users. Therefore, the conventional USB OTG host devices only support a few types of memory card and one-way data transmission, and thus the availability of USB OTG host devices is limited. This further disadvantageously restricts the usability of the USB peripheral devices.

Consequently, there is a need to improve the USB OTG host device to solve the aforementioned problems.

SUMMARY OF THE INVENTION

One objective of the present invention is to provide an integrated data accessing system having control apparatus for multi-directional data transmission for transferring in a bi-directional mode.

According to the above objective, the present invention sets forth an integrated data accessing system having control apparatus for multi-directional data transmission. The integrated data accessing system includes a control apparatus, a plurality of communication interface engines. The control apparatus is used to control the communication interface engines for peripheral devices. The control apparatus controls data transmission of data content among a plurality of storage units.

The control apparatus includes a plurality of bi-directional transmission modules, a control unit, a multi-directional transferring engine, and a memory unit. The bi-directional transmission modules pass the data content in a bi-directional mode. The control unit detects whether a source storage and a target storage of the storage units are connected to a first bi-directional transmission module and a second bi-directional transmission module which are selected from the bi-directional transmission modules, respectively. The multi-directional transferring engine selectively transfers the data content among storage units. The multi-directional transferring engine includes a first switch module, a second switch module, and a data buffer. The first switch module switches to the first bi-directional transmission module to select the source storage. The second switch module switches to the second bi-directional transmission module to select the target storage. The data buffer stores the data content transmitted from the source storage and the target storage. The multi-directional transferring engine transfers the data content in the source storage via the first bi-directional transmission module to the target storage via the second bi-directional transmission module when the control unit triggers the first switch module and the switch second module.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
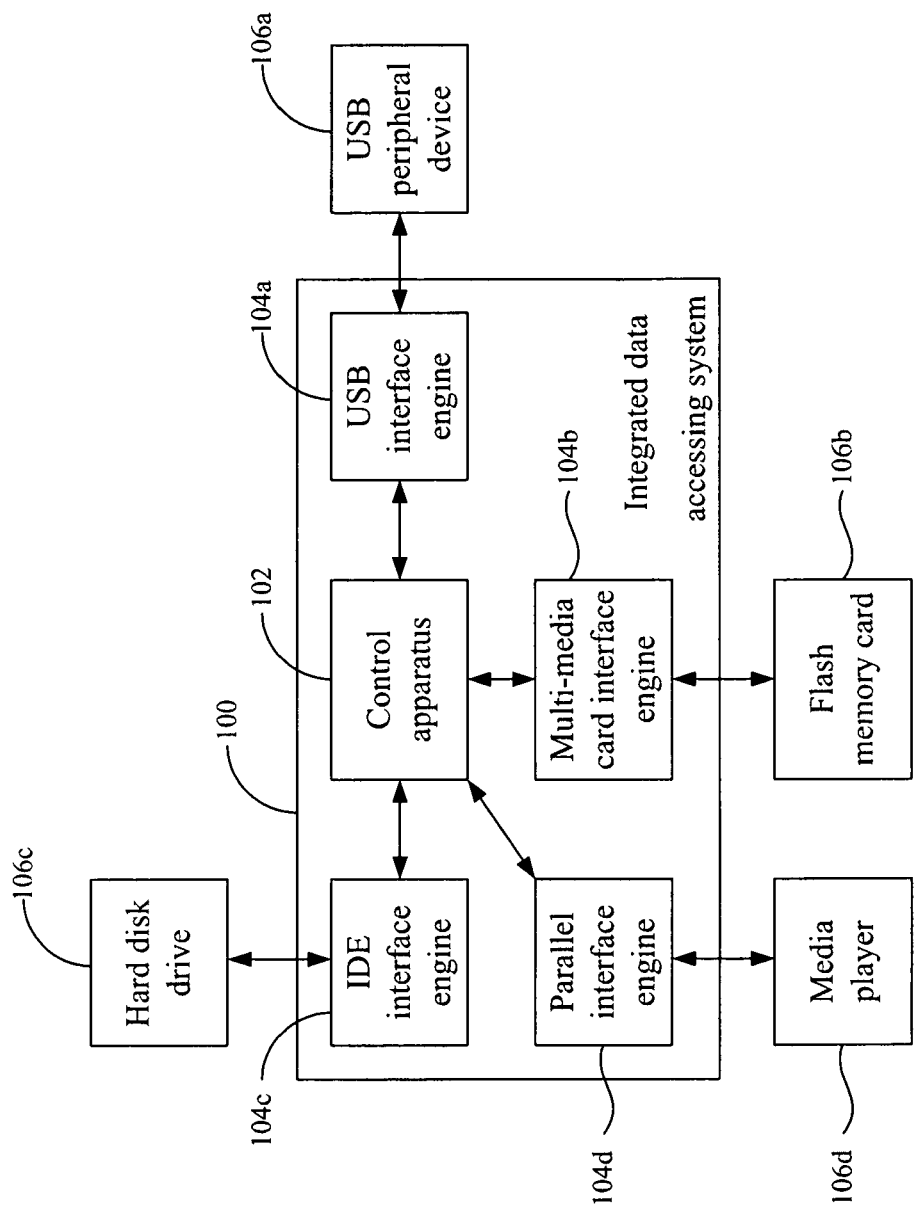
FIG. 1 is a schematic block diagram of an integrated data accessing system having control apparatus according to one embodiment of the present invention.
Figure 2:
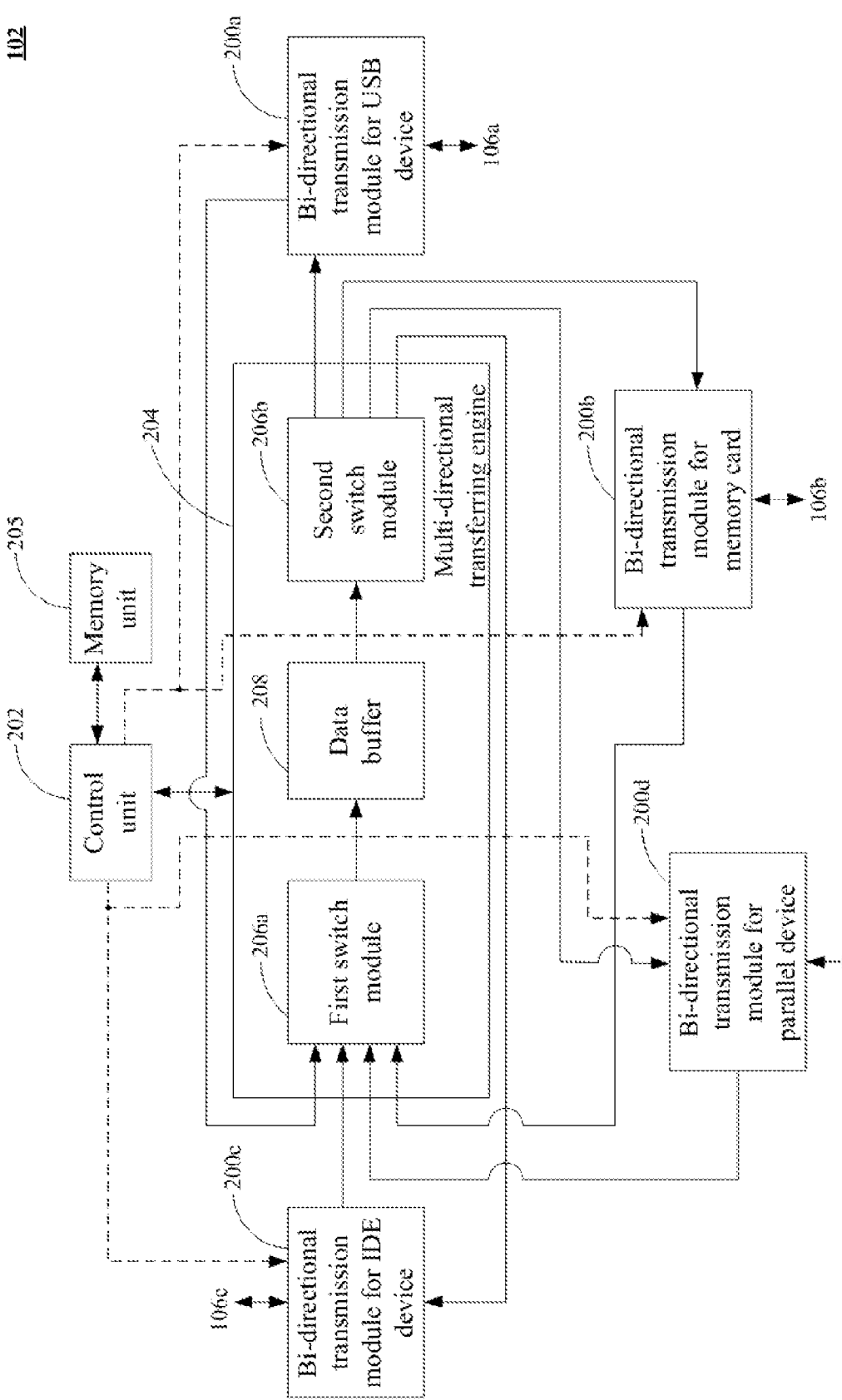
FIG. 2 is a schematic block diagram of the control apparatus shown in FIG. 1 according to one embodiment of the present invention.

FIG. 1 is a schematic block diagram of an integrated data accessing system 100 having control apparatus 102 according to one embodiment of the present invention. The integrated data accessing system 100 includes a control apparatus 102, a plurality of communication interface engines 104a, 104b, 104c, and 104d. The control apparatus 102 is used to control the communication interface engines 104a, 104b, 104c, and 104d for different peripheral devices. The control apparatus 102 controls the data transmission of data content among a plurality of storage units 106a, 106b, 106c, and 106d, and the control apparatus 102 will be described in details below, as shown in FIG. 2. The communication interface engines 104a, 104b, 104c, and 104d are coupled to the bi-directional transmission modules 200a, 200b, 200c, and 200d of the control apparatus 102, respectively, for communicating with the storage units 106a, 106b, 106c, and 106d, respectively, based on the different protocols between the control apparatus 102 and each of the storage units 106a, 106b, 106c, and 106d. In one embodiment, the communication interface engines 104a, 104b, 104c, and 104d are USB interface engine, multi-media card interface engine, Integrated Drive Electronics (IDE) interface engine, and parallel interface engine, respectively, but not limited. The storage units 106a, 106b, 106c, and 106d are USB peripheral device, flash memory card hard disk driver, and media player.

Please refer to FIG. 1 and FIG. 2. FIG. 2 is a schematic block diagram of the control apparatus 102 shown in FIG. 1 according to one embodiment of the present invention. The control apparatus 102 includes a plurality of bi-directional transmission modules 200a, 200b, 200c, and 200d for storage units, a control unit 202, a multi-directional transferring engine 204, and a memory unit 205. The bi-directional transmission modules 200a, 200b, 200c, and 200d are coupled to the communication interface engines 104a, 104b, 104c, and 104d, respectively. The control unit 202 is coupled to the bi-directional transmission modules 200a, 200b, 200c, and 200d, the multi-directional transferring engine 204, and the memory unit 205, respectively. The control apparatus 102 controls the data transmission of data content among a plurality of storage units 106a, 106b, 106c, and 106d.

The bi-directional transmission modules 200a, 200b, 200c, and 200d pass the data content in a bi-directional mode between the multi-directional transferring engine 204 and each of the communication interface engines 104a, 104b, 104c, and 104d. The control unit 202 detects whether a source storage and a target storage of the storage units 106a, 106b, 106c, and 106d are connected to a first bi-directional transmission module and a second bi-directional transmission module which are selected from the bi-directional transmission modules 200a, 200b, 200c, and 200d, respectively. The control unit 202 controls the bi-directional transmission modules 200a, 200b, 200c, and 200d to trigger one of the bi-directional transmission modules to be an input and another of the bi-directional transmission modules to be an output. For an example of a forward transmission direction, the USB device 106a regarded as a source storage of the storage units is connected to the bi-directional transmission modules 200a for USB device and the flash memory card 106b regarded as a target storage of the storage units is connected to the bi-directional transmission modules 200b. That is, the USB device is connected to the flash memory card 106b via the multi-directional transferring engine 204 for a forward data transmission. For an example of a backward transmission direction, the flash memory card 106b regarded as a source storage of the storage units is connected to the bi-directional transmission modules 200b and the USB device 106a regarded as a target storage of the storage units is connected to the bi-directional transmission modules 200a. That is, the flash memory card 106b is connected to the USB device 106a via the multi-directional transferring engine 204 for a backward data transmission. The source storage and target storage is selected from the storage units 106a, 106b, 106c, and 106d by the control unit 202.

In one embodiment, the control unit 102 further determines a source address corresponding to the data content in the source storage and a target address corresponding to the data content in the target storage. The control unit 102 further initializes the source storage and the target storage. The control unit 102 further identifies a first data format of the source storage and a second data format of the target storage for recognizing the format of the data content.

The multi-directional transferring engine 204 selectively transfers the data content among storage units 106a, 106b, 106c, and 106d. The multi-directional transferring engine 204 includes a first switch module 206a, a second switch module 206b, and a data buffer 208. The first switch module 206a is coupled to the bi-directional transmission modules 200a, 200b, 200c, and 200d, respectively, the control unit 202, and the data buffer 208. The second switch module 206b is coupled to the bi-directional transmission modules 200a, 200b, 200c, and 200d, respectively, the control unit 202, and the data buffer 208.

Preferably, the multi-directional transferring engine 204 is compatible to universal serial bus (USB) on-the-go (OTG) protocol. In one embodiment, the multi-directional transferring engine 204 further notifies the control unit 102 when the data content is output completely from the source storage to the target storage.

For example, the bi-directional transmission modules 200a, 200b, 200c, and 200d further includes a bi-directional transmission module for USB device, a bi-directional transmission module for memory card, a bi-directional transmission module for IDE device, and a bi-directional transmission module for parallel device, respectively. The bi-directional transmission module for USB device delivers the data content which is compatible to universal serial bus (USB) protocol. The peripheral devices connected to the bi-directional transmission module for USB device 200a may be digital camera, mobile phone, MP3 player, digital video camera, PDA, and recording pen. The bi-directional transmission module for memory card delivers the data content according to format of a memory card. The bi-directional transmission module for IDE device delivers the data content which is compatible to a hard disk drive. The peripheral devices connected to the bi-directional transmission module for IDE device 200c may be a CD-ROM drive, DVD drive, and a CD-RW. The bi-directional transmission module for parallel device delivers the data content to be played in a media player.

The first switch module 206a switches to the first bi-directional transmission module to select the source storage. The second switch module 206b switches to the second bi-directional transmission module to select the target storage. The data buffer 208 stores the data content transmitted from the source storage and the target storage. The multi-directional transferring engine 204 transfers the data content in the source storage via the first bi-directional transmission module to the target storage via the second bi-directional transmission module when the control unit 102 triggers the first switch module and the switch second module.

In one embodiment, the first switch module 206a of the multi-directional transferring engine 204 further comprises a plurality of input ports connected to the bi-directional transmission modules 200a, 200b, 200c, and 200d, respectively, and an output port connected to the data buffer 208. The second switch module 206b of the multi-directional transferring engine 204 further comprises a plurality of output ports connected to the bi-directional transmission modules 200a, 200b, 200c, and 200d, respectively, and an input port connected to the data buffer 208. In other words, the control unit 202 triggers the first switch module 206a to select one of bi-directional transmission modules 200a, 200b, 200c, and 200d as one input port of the input ports and output the data content to the data buffer 208 via the output port. Afterwards, the data content in the data buffer 208 is transmitted to the second switch module 206b. The control unit 202 then triggers the second switch module 206b to select one of bi-directional transmission modules 200a, 200b, 200c, and 200d as one output port of the output ports and output the data content to one of one of bi-directional transmission modules 200a, 200b, 200c, and 200d. Preferably, the input of the first switch module 206a is different from the output of the second switch module 206b.

The storage units 106a, 106b, 106c, and 106d are selected from a group consisting of a hard disk drive, a memory card, a portable disk, and the combinations. The hard disk drive is compatible to an interface which is selected from a group consisting of AT Attachment (ATA) protocol, AT Attachment Packet Interface (ATAPI) protocol, and Serial AT Attachment (SATA) protocol. The memory card is selected from secure digital (SD) memory card, multi-media card (MMC), and memory stick card. The portable disk is a floppy disk drive.

According to the above-mentioned descriptions, the integrated data accessing system 100 having control apparatus 102 for multi-directional data transmission to transfer the data content in a bi-directional mode. Specifically, the first switch module 206a and the second switch module 206b of the multi-directional transferring engine 204 are utilized to distribute the data content in a bi-directional mode from one input of the bi-directional transmission modules to one output of bi-directional transmission modules. The multi-directional transferring engine 204 of the control apparatus 102 is able to arbitrarily transfer the data content from one the storage unit to another in a bi-directional mode.

Figure 3:
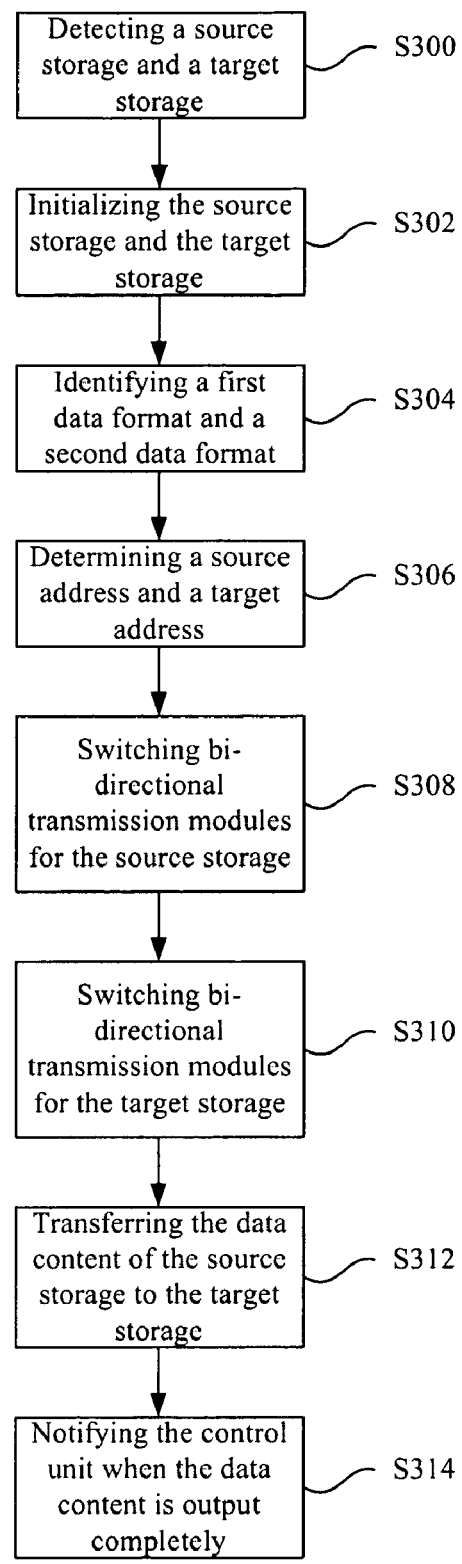
FIG. 3 is a flow chart of performing the control method of the control apparatus in the integrated data accessing system according to one embodiment of the present invention.

Please refer to FIG. 1-2 and FIG. 3. FIG. 3 is a flow chart of performing the control method of the control apparatus in the integrated data accessing system according to one embodiment of the present invention. The control apparatus 102 includes a plurality of bi-directional transmission modules 200a, 200b, 200c, and 200d, a control unit 202, a multi-directional transferring engine 204, and a memory unit 205. The multi-directional transferring engine 204 includes a first switch module 206a, a second switch module 206b, and a data buffer 208. The method comprises the following steps:

In step S300, the control unit 202 detects whether a source storage and a target storage are connected to a first bi-directional transmission module and a second bi-directional transmission module, respectively;

In step S302, the control unit 202 initializes the source storage and the target storage.

In step S304, the control unit 202 identifies a first data format of the source storage and a second data format of the target storage.

In step S306, the control unit 202 determines a source address of the data content in the source storage and a target address corresponding to the data content in the target storage.

In step S308, the first switch module 206a switches a plurality of bi-directional transmission modules for selecting the first bi-directional transmission module for the source storage by;

In step S310, the second switch module 206b switches the bi-directional transmission modules for selecting the second bi-directional transmission module for the target storage.

In step S312, the multi-directional transferring engine 204 transfers the data content corresponding to the source address of the source storage via the first bi-directional transmission module to the target address of the target storage via the second bi-directional transmission module.

In step S314, the multi-directional transferring engine 204 notifies the control unit 202 when the data content is output completely from the source storage to the target storage.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A control apparatus for controlling data transmission of data content among a plurality of storage units, the control apparatus comprising:
   a plurality of bi-directional transmission modules, for passing the data content in a bi-directional mode;
   a control unit coupled to the bi-directional transmission modules, for detecting whether a source storage and a target storage of the storage units are connected to a first bi-directional transmission module and a second bi-directional transmission module which are selected from the bi-directional transmission modules, respectively; and
   a multi-directional transferring engine coupled to the control unit and the bi-directional transmission modules, for selectively transferring the data content among storage units, comprising:
      a first switch module coupled to the bi-directional transmission modules, for switching to the first bi-directional transmission module to select the source storage;
      a second switch module coupled to the bi-directional transmission modules, for switching to the second bi-directional transmission module to select the target storage; and
      a data buffer coupling to the first switch module and the second switch module, for storing the data content transmitted from the source storage and the target storage,
      wherein the multi-directional transferring engine transfers the data content in the source storage via the first bi-directional transmission module to the target storage via the second bi-directional transmission module when the control unit triggers the first switch module and the second switch module.

2. The control apparatus of claim 1, wherein the control unit further determines a source address corresponding to the data content in the source storage and a target address corresponding to the data content in the target storage.

3. The control apparatus of claim 2, wherein the control unit further initializes the source storage and the target storage.

4. The control apparatus of claim 3, wherein the control unit further identifies a first data format of the source storage and a second data format of the target storage.

5. The control apparatus of claim 3, wherein the first switch module of the multi-directional transferring engine further comprises a plurality of input ports connected to the bi-directional transmission modules, respectively, and an output port connected to the data buffer.

6. The control apparatus of claim 3, wherein the second switch module of the multi-directional transferring engine further comprises a plurality of output ports connected to the bi-directional transmission modules, respectively, and an input port connected to the data buffer.

7. The control apparatus of claim 1, wherein the storage units are selected from a group consisting of a hard disk drive, a memory card, a portable disk, and the combinations.

8. The control apparatus of claim 7, wherein the hard disk drive is compatible to an interface which is selected from a group consisting of AT Attachment (ATA) protocol, AT Attachment Packet Interface (ATAPI) protocol, and Serial AT Attachment (SATA) protocol.

9. The control apparatus of claim 7, wherein the memory card is selected from secure digital (SD) memory card, multi-media card (MMC), and memory stick card.

10. The control apparatus of claim 7, wherein the portable disk is a floppy disk.

11. The control apparatus of claim 1, wherein the bi-directional transmission modules further comprises:
- a bi-directional transmission module for USB device coupled to the control unit, for delivering the data content which is compatible to universal serial bus (USB) protocol;
- a bi-directional transmission module for memory card coupled to the control unit, for delivering the data content according to format of a memory card;
- an bi-directional transmission module for IDE device coupled to the control unit, for delivering the data content which is compatible to a hard disk drive; and
- a bi-directional transmission module for parallel device coupled to the control unit, for delivering the data content to be played in a media player.

12. The control apparatus of claim 1, wherein the multi-directional transferring engine is compatible to universal serial bus (USB) on-the-go (OTG) protocol.

13. An integrated data accessing system for transferring data content among a plurality of storage units, the integrated data accessing system comprising:
- a control apparatus, comprising:
  - a plurality of bi-directional transmission modules, for passing the data content in a bi-directional mode;
  - a control unit coupled to the bi-directional transmission modules, for detecting whether a source storage and a target storage of the storage units are connected to a first bi-directional transmission module and a second bi-directional transmission module which are selected from the bi-directional transmission modules, respectively; and
  - a multi-directional transferring engine coupled to the control unit and the bi-directional transmission modules, for selectively transferring the data content in the source storage via the first bi-directional transmission module to the target storage via the second bi-directional transmission module when the control unit triggers the multi-directional transferring engine; and
- a plurality of communication interface engines coupled to the bi-directional transmission modules, respectively, for communicating with the storage units, respectively.

14. The integrated data accessing system of claim 13, wherein the multi-directional transferring engine further comprises:
- a first switch module coupled to the bi-directional transmission modules, for switching to the first bi-directional transmission module to select the source storage;
- a second switch module coupled to the bi-directional transmission modules, for switching to the second bi-directional transmission module to select the target storage; and
- a data buffer coupling to the first switch module and the second switch module, for storing the data content transmitted from the source storage and the target storage.

15. The integrated data accessing system of claim 14, wherein the control unit further determines a source address corresponding to the data content in the source storage and a target address corresponding to the data content in the target storage.

16. The integrated data accessing system of claim 15, wherein the control unit further initializes the source storage and the target storage.

17. The integrated data accessing system of claim 16, wherein the control unit further identifies a first data format of the source storage and a second data format of the target storage by the control unit.

18. The integrated data accessing system of claim 14, wherein the first switch module of the multi-directional transferring engine further comprises a plurality of input ports connected to the bi-directional transmission modules, respectively, and an output port connected to the data buffer.

19. The integrated data accessing system of claim 14, wherein the second switch module of the multi-directional transferring engine further comprises a plurality of output ports connected to the bi-directional transmission modules, respectively, and an input port connected to the data buffer.

20. The integrated data accessing system of claim 14, wherein the storage units are selected from a group consisting of a hard disk drive, a memory card, a portable disk, and the combinations.

21. The integrated data accessing system of claim 20, wherein the hard disk drive is compatible to an interface which is selected from a group consisting of AT Attachment (ATA) protocol, AT Attachment Packet Interface (ATAPI) protocol, and Serial AT Attachment (SATA) protocol.

22. The integrated data accessing system of claim 20, wherein the memory card is selected from secure digital (SD) memory card, multi-media card (MMC), and memory stick card.

23. The integrated data accessing system of claim 20, wherein the portable disk is a floppy disk drive.

24. The integrated data accessing system of claim 14, wherein the bi-directional transmission modules further comprises:
- a bi-directional transmission module for USB device coupled to the control unit, for delivering the data content which is compatible to universal serial bus (USB) protocol;
- a bi-directional transmission module for memory card coupled to the control unit, for delivering the data content according to format of a memory card;
- an bi-directional transmission module for IDE device coupled to the control unit, for delivering the data content which is compatible to a hard disk drive; and
- a bi-directional transmission module for parallel device coupled to the control unit, for delivering the data content to be played in a media player.

25. The integrated data accessing system of claim 14, wherein the multi-directional transferring engine is compatible to universal serial bus (USB) on-the-go (OTG) protocol.

* * * * *